(12) United States Patent
Mutalik et al.

(10) Patent No.: US 6,360,330 B1
(45) Date of Patent: Mar. 19, 2002

(54) SYSTEM AND METHOD FOR BACKING UP DATA STORED IN MULTIPLE MIRRORS ON A MASS STORAGE SUBSYSTEM UNDER CONTROL OF A BACKUP SERVER

(75) Inventors: Madhav Mutalik, Northboro; John Deshayes, Hopkinton; Ananthan Pillai, Brookline; Ajay Shekhar, Norwood, all of MA (US); Benoit J. Merlet, Nashua, NH (US); Faith M. Senie, Bolton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/052,318

(22) Filed: Mar. 31, 1998

(51) Int. Cl.$^7$ ................................................ H02H 3/05
(52) U.S. Cl. ................... 714/4; 714/4; 714/6; 707/205; 707/3
(58) Field of Search .................... 714/4, 6, 13; 709/200; 707/205, 10, 42, 3, 200; 700/94

(56) References Cited

U.S. PATENT DOCUMENTS

| | | | | |
|---|---|---|---|---|
| 5,276,860 A | * | 1/1994 | Fortier et al. ................ | 395/575 |
| 5,634,052 A | * | 5/1997 | Morris ......................... | 395/601 |
| 5,754,782 A | * | 5/1998 | Masada ....................... | 395/200 |
| 5,778,395 A | * | 7/1998 | Whitting et al. ............. | 707/204 |
| 5,829,019 A | * | 10/1998 | Thompson et al. ........... | 711/113 |
| 5,832,522 A | * | 11/1998 | Blickenstaff et al. ......... | 707/204 |
| 5,835,953 A | * | 11/1998 | Ohran ......................... | 711/162 |
| 5,913,926 A | * | 6/1999 | Anderson et al. ............. | 714/6 |
| 5,915,252 A | * | 6/1999 | Misheski et al. ............. | 707/103 |

\* cited by examiner

*Primary Examiner*—Ayaz Sheikh
*Assistant Examiner*—Firmin Backer
(74) *Attorney, Agent, or Firm*—John M Gunther; Leanne J Fitzgerald; Robert Kevin Perkins

(57) ABSTRACT

A backup server controls the backing up of data stored on a mass storage subsystem in response to a backup request from a host identifying data to be backed up during a backup operation, the mass storage subsystem storing data in a plurality of mirrored copies. The backup server comprises a discovery module, a preparation module, an execution module and a clean-up module. The discovery module receives the backup request and identifies, during a discovery phase, at least one storage location on the mass storage subsystem on which data to be backed up during the backup operation is stored. The preparation module, during a preparation phase following the discovery phase, enables the mass storage subsystem to sever one of said mirrored copies and make it available to backup server for the backup operation. In addition, prior to enabling the mass storage subsystem to sever one of the mirrored copies, the preparation module will notify the host, which will stop operating in connection with the data from the mass storage subsystem, and after the mirrored copy has been severed, the preparation module will so notify the host so that it can resume operating in connection with data from at least one of the other copies. The execution module, during the execution phase, enables the mass storage subsystem to retrieve data from the at least one storage location and transfer the retrieved data to the backup server to facilitate backup storage. The clean-up module, during a clean-up phase following the execution phase, verifies that the data to be backed up has been stored in backup storage and enable the mass storage subsystem to re-synchronize the mirrored copies. The backup server also performs a restore operation in response to a restore request from the host.

22 Claims, 12 Drawing Sheets

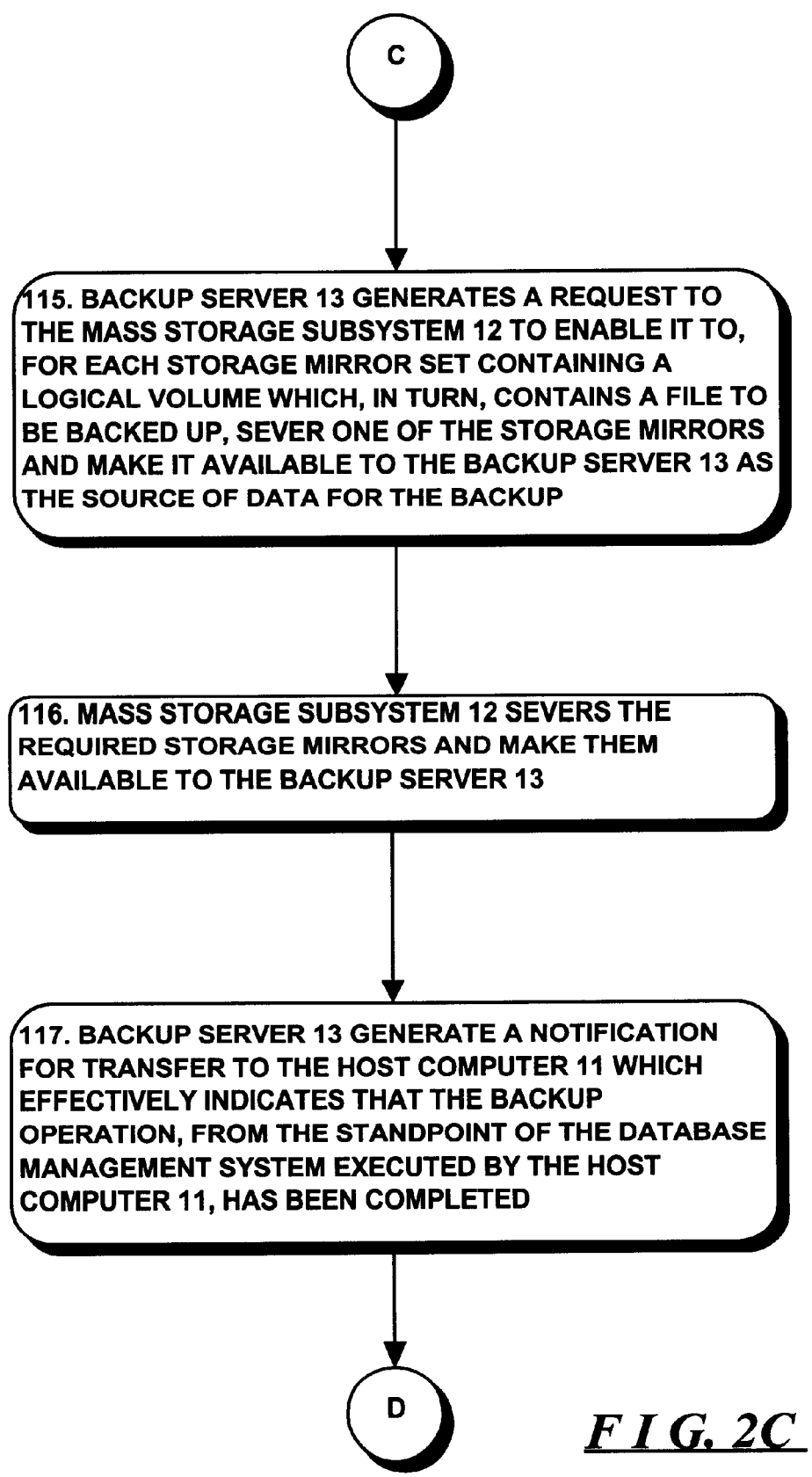

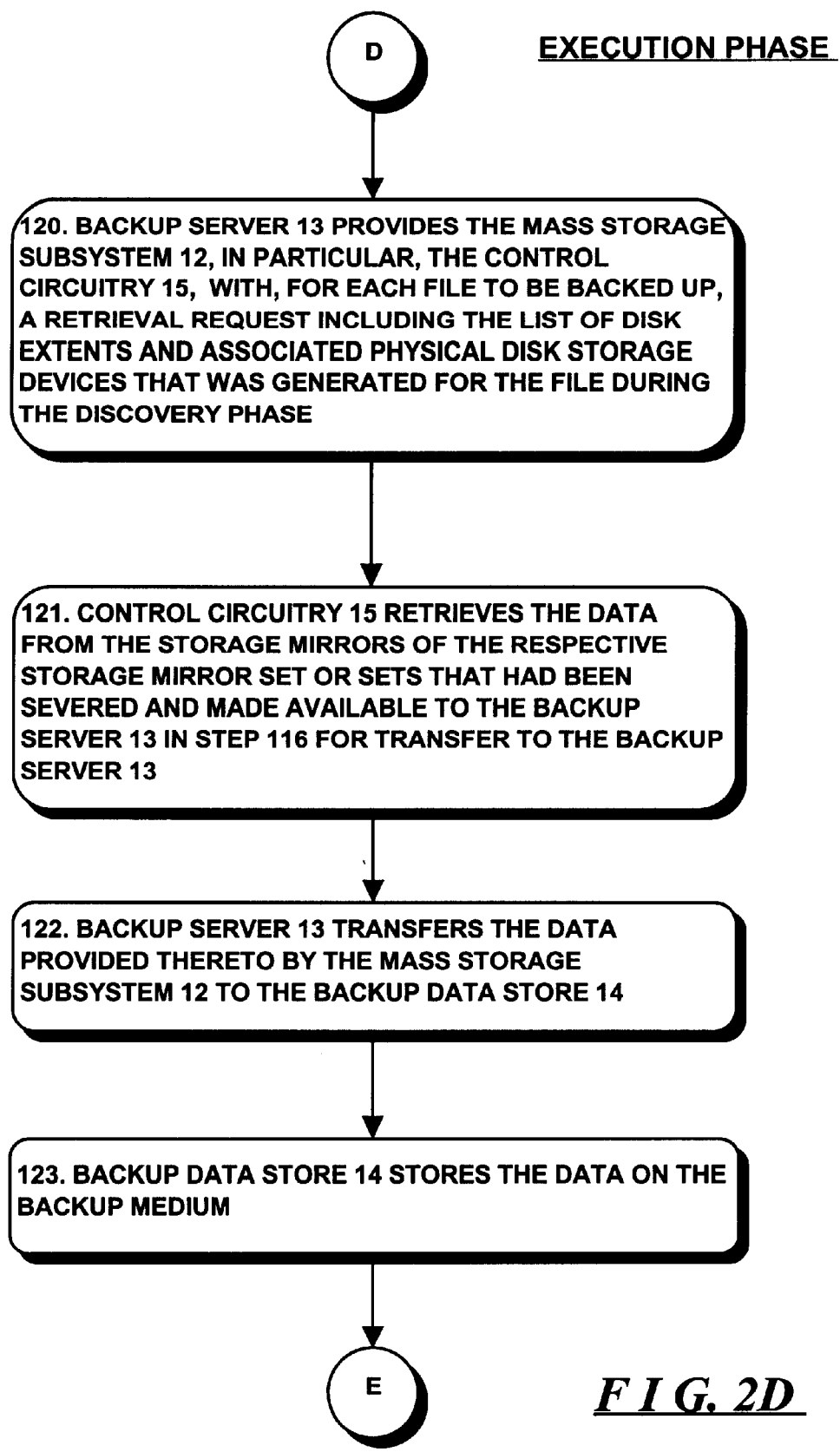

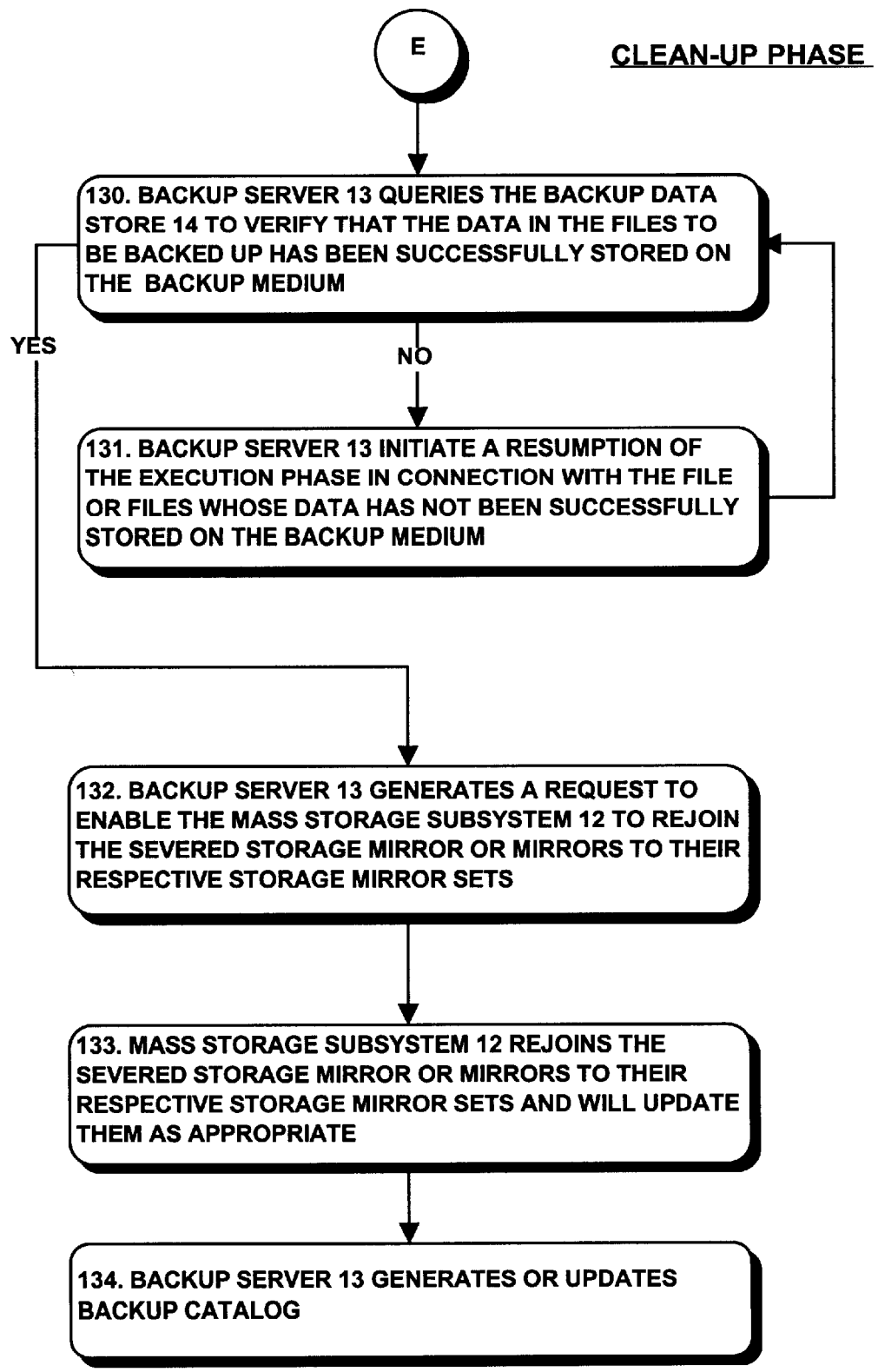

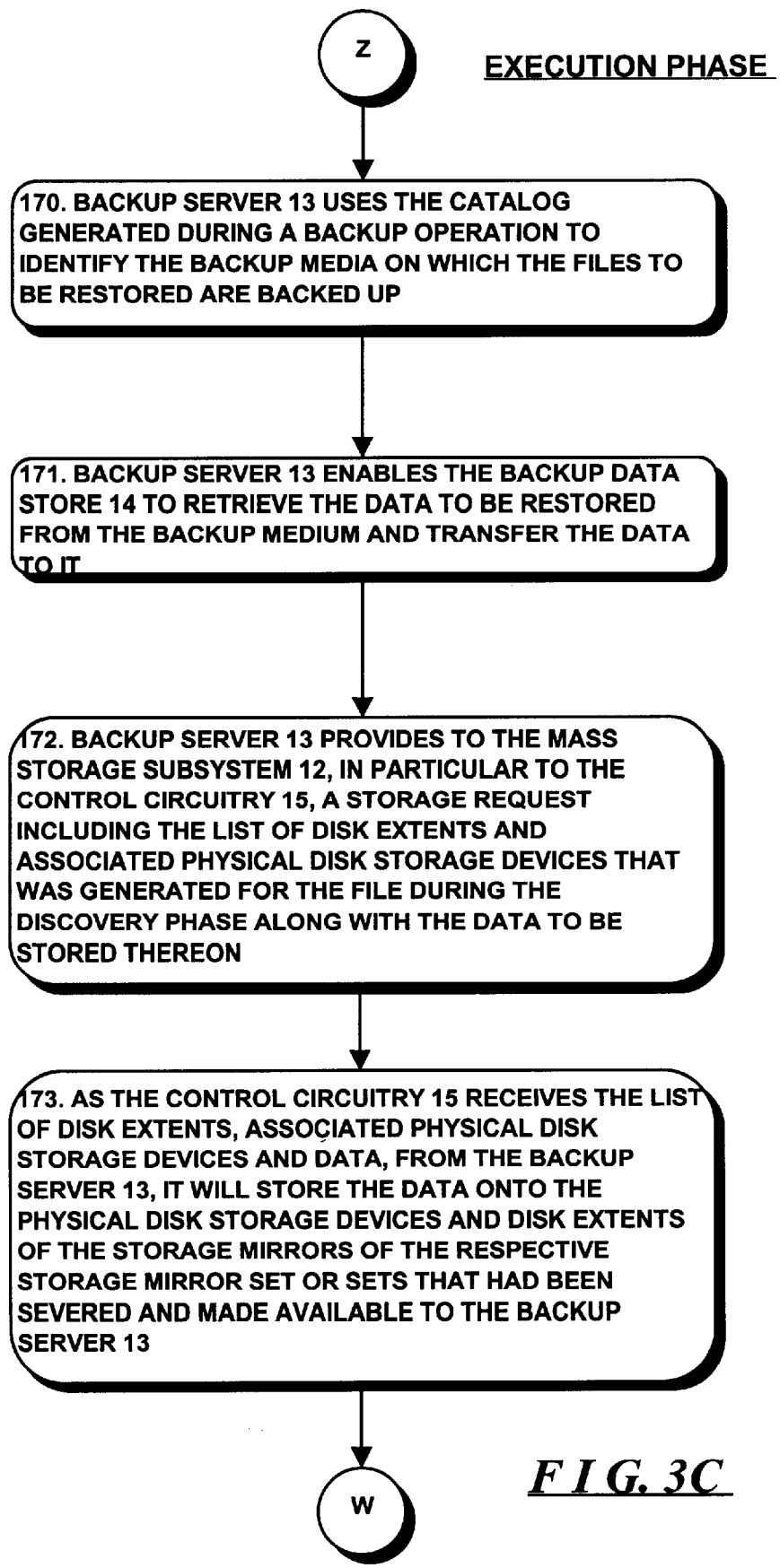

SYSTEM AND METHOD FOR BACKING UP DATA STORED IN MULTIPLE MIRRORS ON A MASS STORAGE SUBSYSTEM UNDER CONTROL OF A BACKUP SERVER

INCORPORATION BY REFERENCE

U.S. patent application Ser. No. 09/052,208, filed on even date herewith in the names of Madhav Mutalik, et al., and entitled "System And Method For Backing Up Data Stored In Multiple Mirrors On A Mass Storage Subsystem Under Control Of A Backup Server", assigned to the assignee of this application and incorporated herein by reference.

U.S. patent application Ser. No. 09/052,356, filed on even date herewith in the names of Madhav Mutalik, et al., and entitled "System And Method For Performing File-Handling Operations IN A Digital Data Processing System Using An Operating System-Independent file Map", assigned to the assignee of this application and incorporated herein by reference.

U.S. patent application Ser. No. 09/052,209, filed on even date herewith in the names of Madhav Mutalik et al., and entitled "System And Method For Generating An Operating System-Independent File Map", now U.S. Pat. No. 6,029,166 issued Feb. 22, 2000 assigned to the assignee of this application and incorporated herein by reference.

FIELD OF THE INVENTION

The invention relates generally to the field of digital data processing systems and more particularly to mass digital data storage subsystems. The invention provides a system and method for performing backup of data stored in a mass storage subsystem.

BACKGROUND OF THE INVENTION

Digital computer systems are used in a number of applications in which virtually continuous availability of data is important to the operation of businesses or other entities using the systems. Generally, computer centers will periodically produce back-up copies of data on their various digital computer systems. Such back-up copies are usually not maintained on a continuous basis, but instead at particular points in time, often at night when the normal processing load on the computer centers is reduced and modifications to the data being backed up may be minimized, and in any case represent the data at the particular points in time at which the back-up copies are generated. Accordingly, if a failure occurs between back-ups, data which has been received and processed by the digital computer systems since the last back-up copy was produced, may be lost. Typically, such back-up copies will be maintained by the computer centers at their respective sites so that they may be used in the event of a failure, although some off-site archival back-ups may be maintained. Significant additional problems arise in the case of, for example, catastrophic events that can occur, such as may result from, for example, fire, flood or other natural disasters, intentional tampering or sabotage and the like, which may result in unintentional or intentional damage to an entire site or some significant portion thereof, since some or all of the back-up copies may also be damaged and the data contained thereon may be unavailable.

Several backup strategies have been developed. In one strategy, software which maintains and controls the data to be backed up, such as database software, initiates and performs the backup operation. In such an arrangement data, generally in the form of incremental changes to a database, is provided by the database software to a backup management software, which stores the data on a backup device. One advantage of this strategy is that, since only incremental changes are backed up, less data needs to be backed up at any point in time. A disadvantage is, however, that although less data is copied with this strategy, a load is still exerted on the production system processing the database software.

In a second strategy, backups are performed outside the database software. In this strategy, data files are backed up independently of the database software. While this minimizes the load on the production system processing the database software and can result in relatively high-speed backups of full data files, the backup and restore operations do not make use of the facilities that are currently provided in commercial database software.

U.S. patent application Ser. No. 08/820,912, filed Mar. 19, 1997 in the name of Philip Tamer, et al., entitled RDF-Based and MMF-Based Backups, (hereinafter "the Tamer application") assigned to the assignee of the present application, discloses another strategy. In the strategy described in the Tamer application, a data storage subsystem stores data in mirrored form, that is, it stores several copies of the data within the single data storage subsystem. Normally, when a particular item of data is modified, the data storage subsystem updates the data item in all of the copies so as to keep all of the copies coherent and in synchronization. During a backup operation, the data storage subsystem essentially de-links the copies, using one copy for data accesses by the database software and the other copy for backup. During the backup operation, modified data items are only stored in the copy that is used for data accesses. A "modified data item" record is maintained for each data item that is modified during the backup operation. After the backup operation, the "modified data item" records are processed to update the copy used for the backup operation to make the two copies identical. This is done by copying each modified data item from the copy used for data accesses to the copy used for the backup operation.

SUMMARY OF THE INVENTION

The invention provides a new and improved system and method for backing up data stored in multiple mirrors on a mass storage subsystem under control of a backup server.

In brief summary, a backup server in one aspect controls the backing up of data stored on a mass storage subsystem in response to a backup request from a host identifying data to be backed up during a backup operation, the mass storage subsystem storing data in a plurality of mirrored copies. The backup server comprises a discovery module, a preparation module, an execution module and a clean-up module. The discovery module receives the backup request and identifies, during a discovery phase, at least one storage location on the mass storage subsystem on which data to be backed up during the backup operationis stored. The preparation module, during a preparation phase following the discovery phase, enables the mass storage subsystem to sever one of said mirrored copies and make it available to backup server for the backup operation. In addition, prior to enabling the mass storage subsystem to sever one of the mirrored copies, the preparation module will notify the host, which will stop operating in connection with the data from the mass storage subsystem, and after the mirrored copy has been severed, the preparation module will so notify the host so that it can resume operating in connection with data from at least one of the other copies. The execution module, during the execution phase, enables the mass storage subsystem to retrieve data from the at least one storage location and transfer the retrieved data to the backup server to facilitate backup storage. The clean-up module, during a cleanup phase following the execution phase, verifies that the data to be backed up has been stored in backup storage and enables the mass storage subsystem to re-synchronize the mirrored copies.

A benefit of the use of a backup server, separate and apart from a host, for controlling backup during a backup operation, is that the host is relieved of the burden of managing backup operations, which can enhance throughput by the host.

In another aspect, the backup server controls the restoration of data on a mass storage subsystem in response to a restore request from a host identifying data to be restored during a restore operation. In that aspect, the discovery module receives the restore request and identify during a discovery phase at least one storage location on the mass storage subsystem on which data to be restored during the backup operation. The preparation module, during a preparation phase after the discovery phase, notifies the host that the backup server is in condition to enter an execution phase. The execution module, during the execution phase, enables the mass storage subsystem to receive data from backup storage and store it on the at least one storage location to facilitate restoration. The clean-up module configured to, during a clean-up phase following the execution phase, verify that the data to be restored has been stored on the at least one storage location and, if so, enable the mass storage subsystem to re-synchronize the mirrored copies and notify the host that the restore operation has completed.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
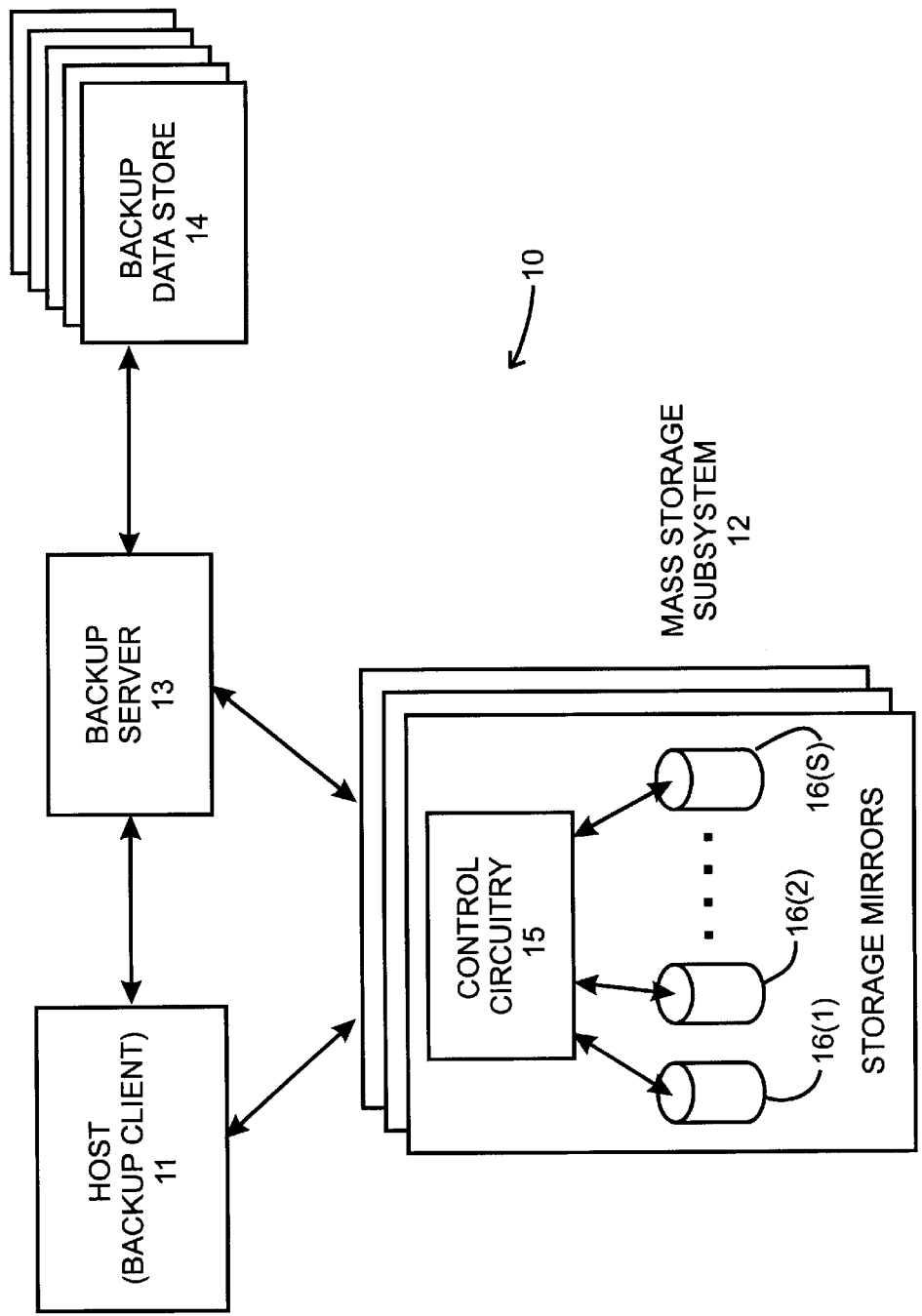
FIG. 1 is a functional block diagram of a digital data processing system including an arrangement for backing up data, constructed in accordance with the invention.

FIG. 1 is a functional block diagram of a digital data processing system 10 including an arrangement for backing up data, constructed in accordance with the invention. With reference to FIG. 1, digital data processing system 10 includes host computer 11, one or more mass storage subsystems generally identified by reference numeral 12, a backup server 13, and one or more backup data stores generally identified by reference numeral 14. The host computer 11, which, as will be described below, also operates as a backup client, executes an application which makes use of the data stored in the mass storage subsystems 12. In one particular illustrative embodiment, the application comprises the well-known Oracle 7 database management system (DBMS) program available from Oracle Corporation, although it will be appreciated that the digital computer system may also or instead process DBMS programs from other manufacturers, as well as other programs which are not DBMS programs. In the embodiment described herein, it will be assumed that the system 10 includes one mass storage subsystem 12 although it will be appreciated that embodiments of the invention may have multiple mass storage subsystems.

The mass storage subsystem 12 used in digital data processing system 10 includes a mass-or secondary-storage subsystem which stores data in disk-based storage. In one embodiment, the mass storage subsystem 12 comprise the mass storage subsystem similar to that described in, for example, U.S. Pat. No. 5,206,939, entitled "System And Method For Disk Mapping And Data Retrieval," issued Apr. 27, 1993 to Moshe Yanai, et al, U.S. patent application. Ser. No. 07/893,509 filed Jun. 4, 1995, in the name of Moshe Yanai, et al., entitled "System And Method For Dynamically Controlling Cache Management," and U.S. Pat. No. 5,592, 432, entitled "Cache Management System Using Time Stamping For Replacement Queue," issued Jan. 7, 1997 in the name of Natan Vishlitzky, et al., all of which are assigned to the assignee of the present invention and incorporated herein by reference, although it will be appreciated that any mass storage subsystem may be used with the present invention. In that embodiment, the mass storage subsystem 12 includes one or more disk storage units which store data in magnetic form, and further utilizes large caches to cache data retrieved from the disk storage units to be transferred to the host 11 for processing and updated data provided by the host 11 to be transferred to the disk storage units for storage, all under control of circuitry generally identified as control circuitry 15. In that embodiment, the mass storage subsystem 12 stores data in multiple storage mirrors 16(1) through 16(S) (generally identified by reference numeral 16(s)). The various mirrors 16(s) contain copies of the same data; when the host computer 11 enables data to be updated, the control circuitry will update the corresponding copy of the data on all of the mirrors 16(s). The multiple mirrors 16(s) allow for continued availability of data in the event of a malfunction of disk storage units in one of the mirrors. As will be described below, the multiple mirrors allow for backup from one of the mirrors while the host computer 11 has continued access to data on the other mirrors.

The invention provides an arrangement, including the backup server 13 and backup data stores 14, for backing up the data stored on the mass storage subsystem 12, thereby reducing the likelihood of data loss in the event of a malfunction or other failure of one or more disk drive units or other components of the mass storage subsystem 12. The backup server 13 initiates backup operations in response to requests therefor from the host computer 11, so that the host computer 11 is effectively a backup client of the backup server 13. In one embodiment, the backup server 13 includes a suitably-programmed digital computer, such as a workstation or personal computer. After receiving a request from the host computer 11, the backup server 13 will initiate a backup operation in connection with data stored on the mass storage subsystem 12. The details of the operations performed by the backup server 13 will be described below. During those operations, the backup server 13 will retrieve data that is to be backed up from the mass storage subsystem 12 and transfers it to the backup data store 14 for backup storage. In one embodiment, the backup data store 14 stores data provided thereto by the backup server 13 on magnetic tape cartridges (not separately shown), and the backup data store 14 will include one or more drives and associated circuitry (also not separately shown) for storing the data on the cartridges. The backup data store 14 may also include an auto changer arrangement for loading respective cartridges onto the drives, and for removing respective cartridges from the drives after they are full.

In addition to performing backup operations, the backup server 13 and backup data store 14 can also perform a restore operation, in which data which has been backed up onto the backup data store 14, is restored to the mass storage subsystem 12. This may occur, for example, following correction of a malfunction in the mass storage subsystem 12 or the host computer 11 in which data may have become lost or corrupted. In a restore operation, the backup server 13, after receiving a request therefor from the host computer 11, will enable the backup data store 14 to retrieve the data that is to be restored from the respective tape cartridge or cartridges on which it was previously stored, and transfer it (that is, the retrieved data) to the mass storage subsystem for storage. The mass storage subsystem's control circuitry 15 will distribute the data to the respective storage mirrors 16($s$) in a conventional manner.

As noted above, the backup server 13 performs a backup operation in response to a request therefor from the host computer 11 operating as backup client. Generally, the backup operation performed by the backup server 13 proceeds in four phases, which are identified herein as a discovery phase, a preparation phase, an execution phase and a final clean-up phase. Detailed operations performed by the backup server 13 in each of the phases will be described below in connection with the flowchart depicted in FIG. 2. Generally, in the discovery phase, the backup server 13, using the identification provided by the host computer 11 of particular files which are stored on the mass storage subsystem 12 that are to be backed up, identifies the particular storage mirrors 16($s$) which contain the files that are to be backed up, along with the respective disks and locations on the disks which contain them.

In the preparation phase, the backup server 13 notifies the host computer 11, as backup client, that it is ready to perform the backup. The host computer 11 may, in response to the notification from the backup server 13, perform certain predetermined operations in connection with the data stored on the mass storage subsystem 12 which may be required before the data is backed up. Thereafter, the host computer 11 is in a backup state, in which it will not update the data in the mass storage subsystem 12, and may, indeed, halt operations. Thereafter, the backup server 13 enables the mass storage subsystem 12 to sever one of the storage mirrors 16($s_s$) from the other storage mirrors and make the severed storage mirror 16($s_s$) available to it for backup. The storage mirror 16($s_s$) that has been severed will be used to provide the data to be backed up. After the storage mirror has been severed, the backup server 13 will enable the host computer 11 to leave the backup state and return to its normal operational state, during which it (that is, the host computer 11) can update the data in the mass storage subsystem 12. However, for the storage mirror 16($s_s$) which have been severed, the control circuitry 15 will not update that storage mirror 16($s_s$) when the host computer 11 updates the data on the mass storage subsystem 12. If the mass storage subsystem 12 maintains several sets of storage mirrors, depending on the particular files to be backed up and the set or sets of storage mirrors in which they may be stored, the backup server 13 may enable the mass storage subsystem 12 to sever a storage mirror from multiple sets of storage mirrors.

Following the preparation phase, the backup server 13 initiates the execution phase. Generally, in that phase the backup server 13 enables the mass storage subsystem 12 to retrieve data that is to be backed up from the severed storage mirror 16($s_s$) or mirrors and transfer the retrieved data to the backup data store 14 for storage. During the execution phase, the host computer 11 can continue operations, and in that connection can enable the mass storage subsystem 12 to retrieve data from and update data on the other storage mirrors, that is, storage mirrors other than the severed storage mirror 16($s_s$) or mirrors which provide the data for the backup. Generally, while one storage mirror 16($s_s$) is severed from other members of its storage mirrors set during a backup operation, the mass storage subsystem's control circuitry 15 will maintain a record of the portions of those storage mirrors which have been updated while the data was being backed up from the severed storage mirror 16($s_s$), which record will later be used to update the severed storage mirror 16($s_s$).

Following the execution phase, after all of the data to be backed up has been retrieved from the mass storage subsystem 12 and stored on the backup data store 14, the backup server 13 will initiate the clean-up phase. Generally, in that phase, the backup server 13 will verify that all of the data that was to be backed up has, in fact, been backed up on the backup data store 14. In addition, the backup server 13 will enable the mass storage subsystem 12 to rejoin the severed storage mirror 16($s_s$) to its storage mirror set and in that process, if there were any updates to the storage mirror set during the execution phase, provide those updates to the storage mirror 16($s_s$) to synchronize the storage mirror 16($s_s$) to the other members of the set. In that operation, the mass storage subsystem 12 will use the record of updated portions as described above to identify the portions of the other storage mirrors in the set which were updated after the storage mirror 16($s_s$) was severed and update the storage mirror 16($s_s$) so that all storage mirrors 16($s$) will be identical. In addition, the backup server 13 can update the backup catalog to reflect the information backed up on the backup data store 14 during the backup operation.

As noted above, the backup server 13 and backup data store 14 can also perform a restore operation to restore data which has been backed up onto the backup data store 14 to the mass storage subsystem 12. Generally, the restore operation performed by the backup server 13 proceeds in four phases, which are identified herein as a discovery phase, a preparation phase, an execution phase and a final clean-up phase. Detailed operations performed by the backup server 13 in each of the phases will be described below in connection with the flowchart depicted in FIG. 3. Generally, in the discovery phase, the backup server 13, using the identification provided by the host computer 11 of particular files which are to be restored, identifies the particular storage mirrors 16($s$) which contain the files that are to be backed up, along with the respective disks and locations on the disks which contain them.

In the preparation phase, the backup server 13 notifies the host computer 11, as backup client, that it is ready to perform the restore operation. Since, during restoration operation, data is being restored onto the mass storage subsystem 12 because of a malfunction of the mass storage subsystem 12, corruption of data stored on the mass storage subsystem 12, or the like, the host computer 11 will generally not be operating in connection with the data stored on the mass storage subsystem 12. To ensure that the host computer 11 is not operating, in particular to ensure that the application executed on the host computer 11 is not operating at least in such a manner as to attempt to make use of or update the data stored in the mass storage subsystem 12, the backup server 13 will notify the host computer 11 accordingly. Such a notification will typically disable operations of the application being executed on the host computer 11. In addition, the backup server 13 enables the mass storage subsystem 12 to sever one of the storage mirrors 16($s_s$) from the other storage mirrors and make the severed storage mirror 16($s_s$) available to it for the restore operation.

Following the preparation phase, the backup server 13 initiates the execution phase. Generally, in that phase the backup server 13 enables the backup media store 14 to retrieve data that is to be restored to the severed storage mirror 16($s_s$) or mirrors and transfer the retrieved data to the mass storage subsystem 12 for storage. During the execution phase, unlike during a backup operation, the host computer 11, in particular the application which would normally use the data on the mass storage subsystem 12, will remain disabled. In a manner similar to that described above in connection with the backup operation, during the restoration operation, the mass storage subsystem 12 will maintain a record of the data restored in the severed storage mirror 16($s_s$) during the restore operation, so that, after the data has been restored and the severed storage mirror 16($s_s$) is rejoined to its storage mirror set, the restored data can be copied to the other members of the storage mirror set.

Following the execution phase, after all of the data to be restored has been retrieved from the backup data store 14 and stored on the severed storage mirror 16($s_s$) of the mass storage subsystem 12, the backup server 13 will initiate the clean-up phase. Generally, in that phase, the backup server 13 will verify that all of the data that was to be restored has, in fact, been restored to the mass storage subsystem 12. In addition, the backup server 13 will enable the mass storage subsystem 12 to rejoin the severed storage mirror 16($s_s$) to its storage mirror set and notify the host computer 11 that the restore operation has been completed. The mass storage subsystem 12, in rejoining the severed storage mirror 16($s_s$ to its storage mirror set, will copy the data restored to the storage mirror 16($s_s$) to the other members of its storage mirror set, thereby to synchronize the other members of the set to the storage mirror 16($s_s$) to which the data was restored. At this point, all of the members of the storage mirror set including the storage mirror 16($s_s$) to which the backup server 13 restored the data during the restore operation will contain the restored data. While the mass storage subsystem 12 is copying the data from the storage mirror 16($s_s$) to the other members of its storage member set, if the host computer 12 needs to retrieve data stored on the storage mirror set, the mass storage subsystem 12 can retrieve the data from the storage mirror 16($s_s$) to which the data was restored during the restore operation, since, until all of the other storage mirrors in the storage mirror set have been updated, that storage mirror 16($s_s$) contains correct data.

Figure 2:
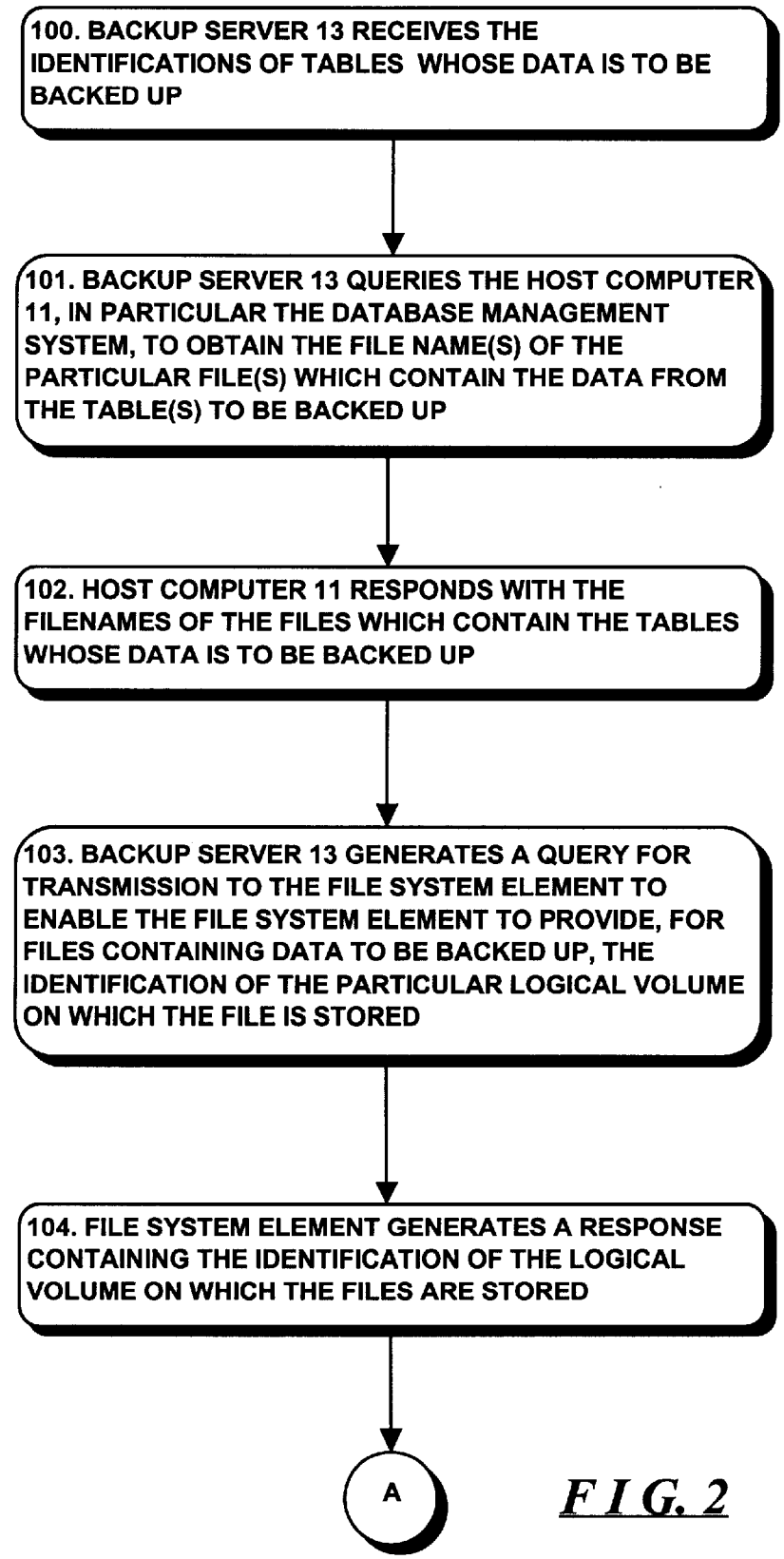
FIG. 2 is a flowchart depicting operations performed by the digital data processing system during a backup operation.
Figure 2A:
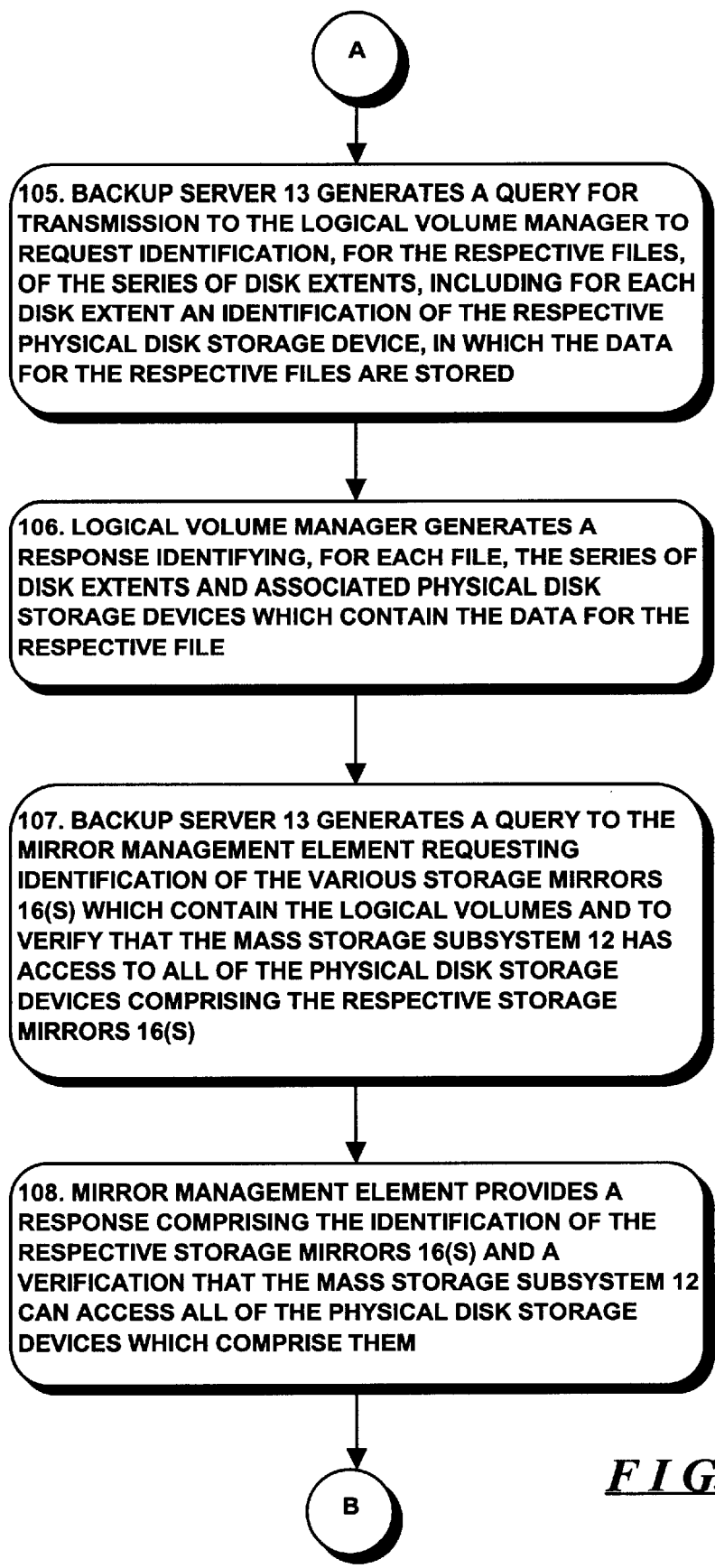
Figure 2B:
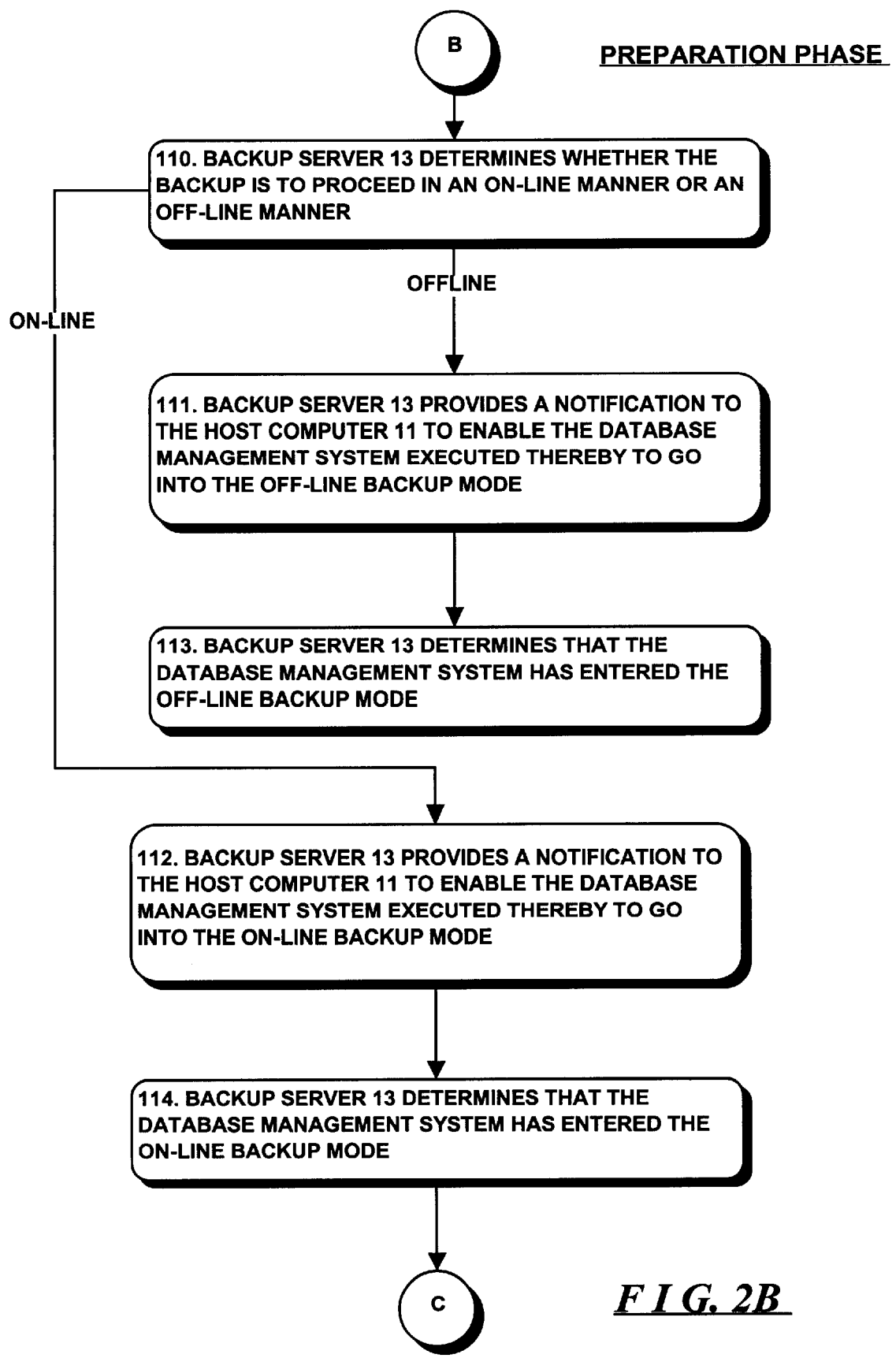
Figure 3:
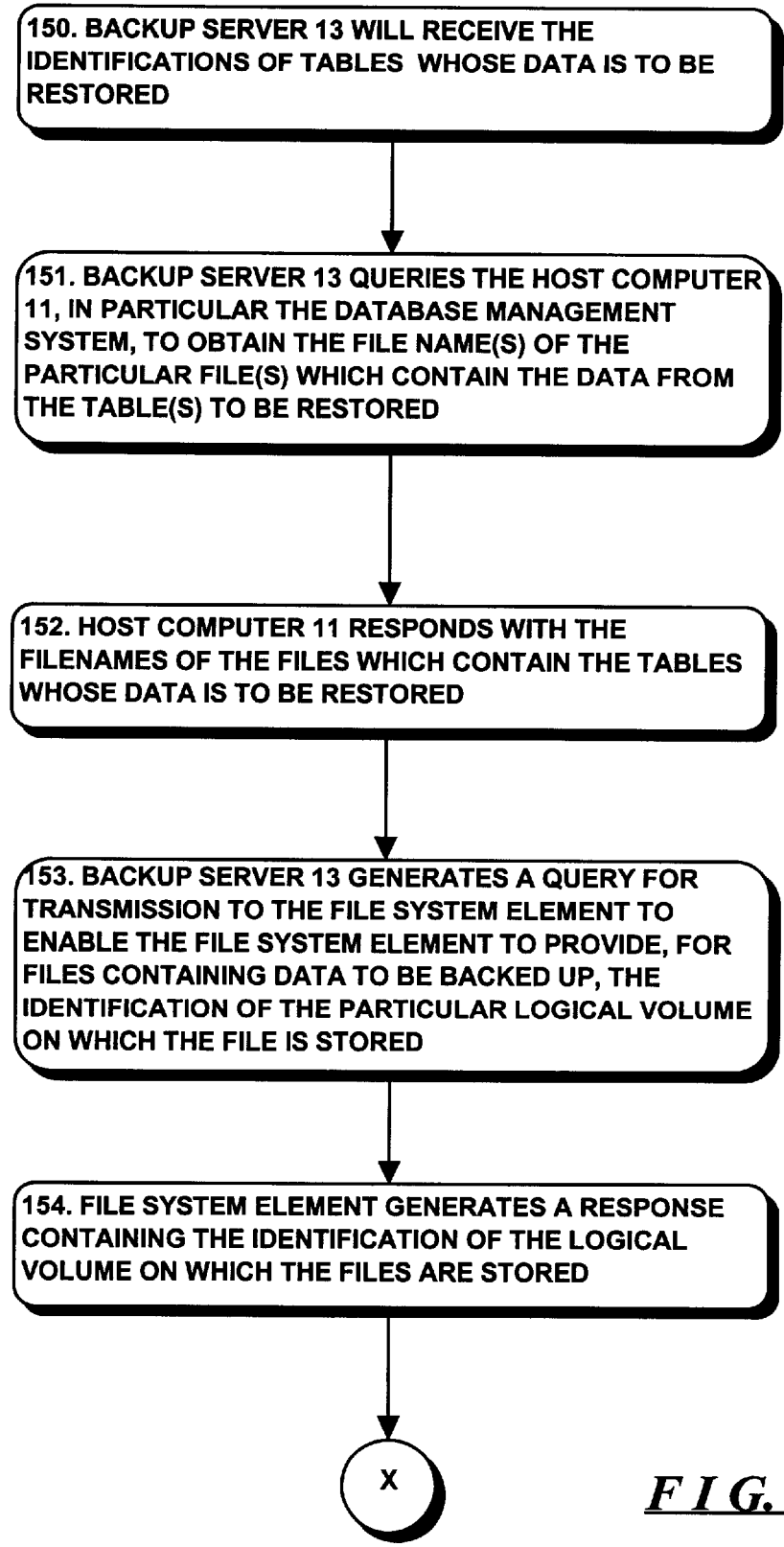
FIG. 3 is a flowchart depicting operations performed by the digital data processing system during a restore operation.
Figure 3A:
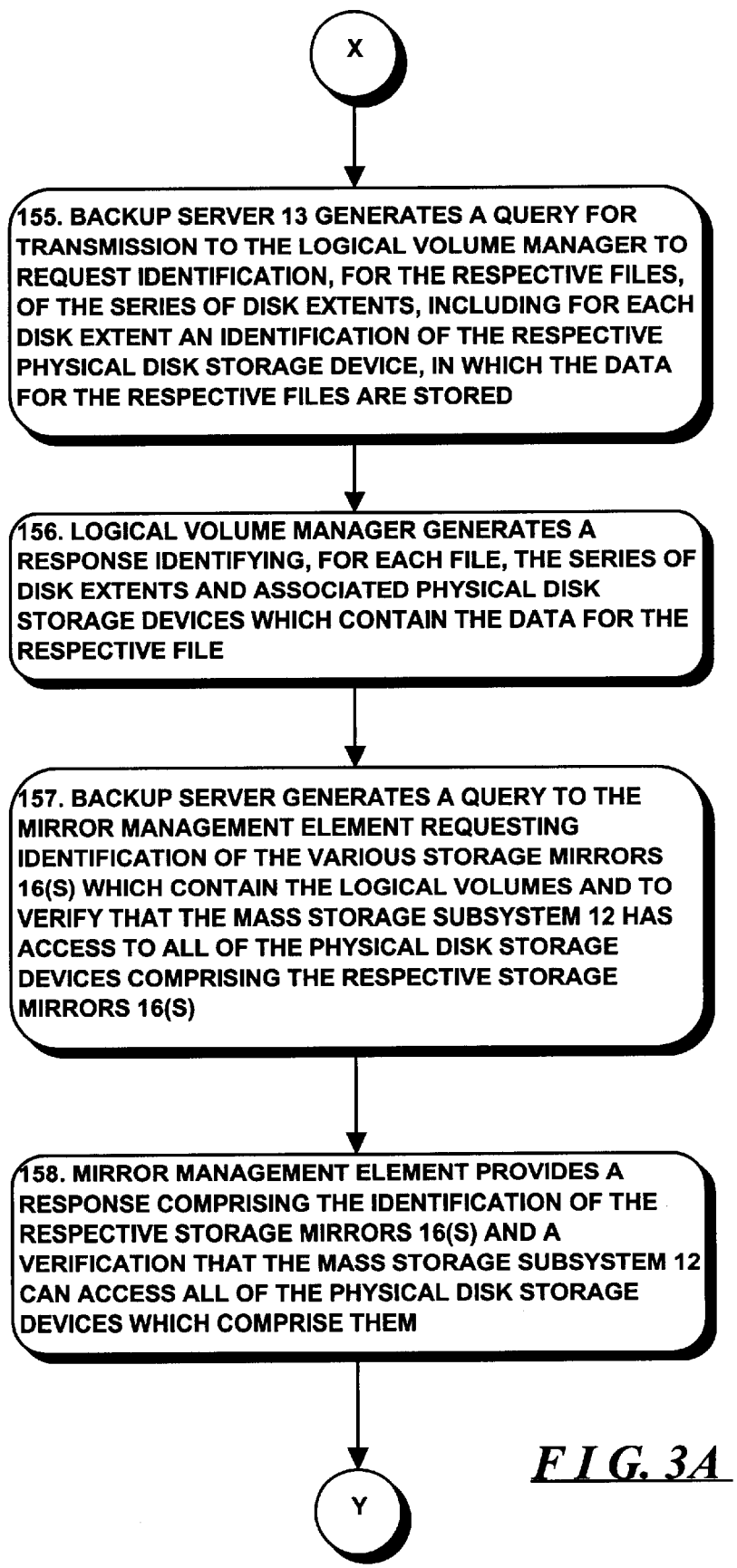
Figure 3B:
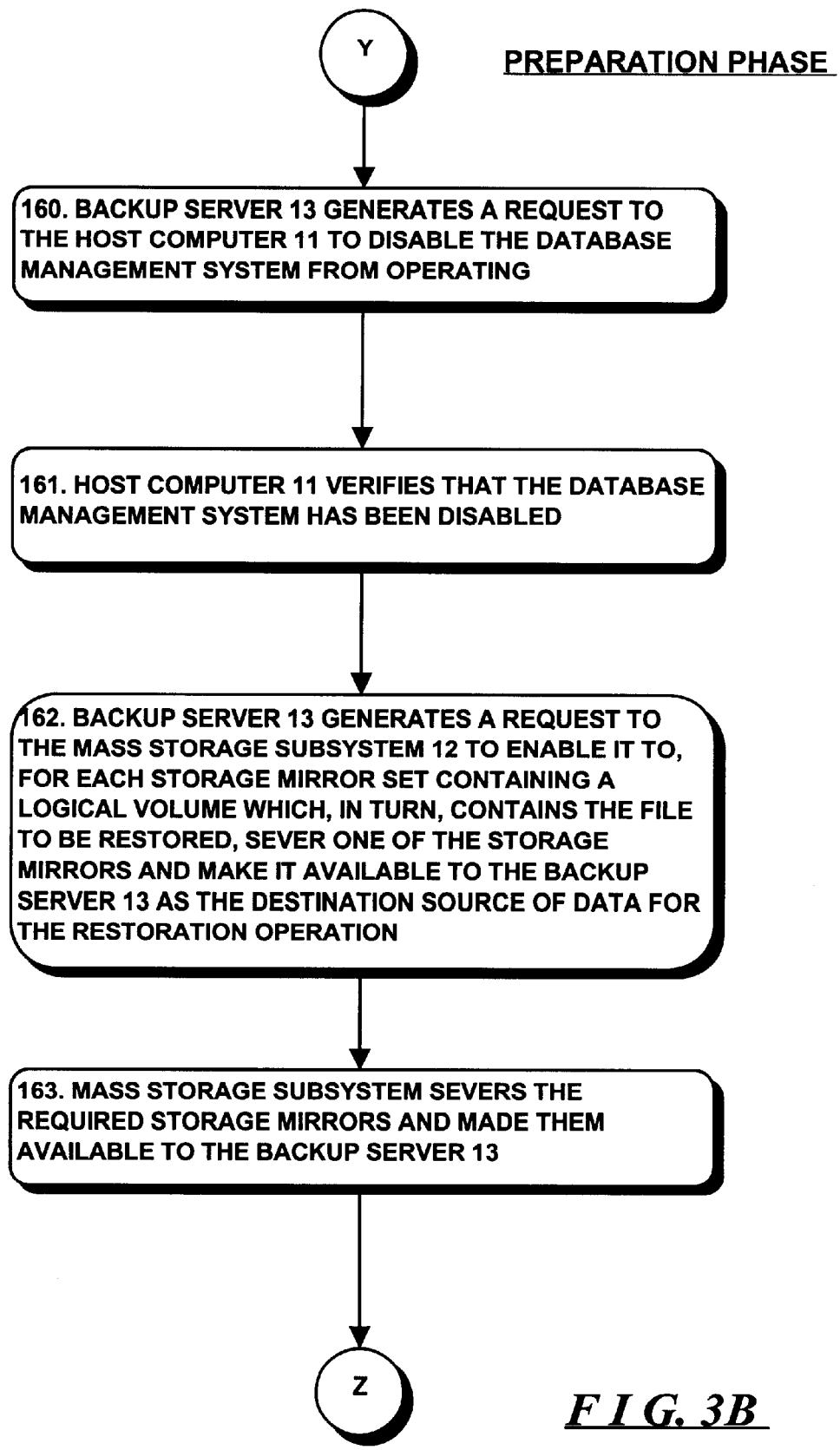
Figure 3D:
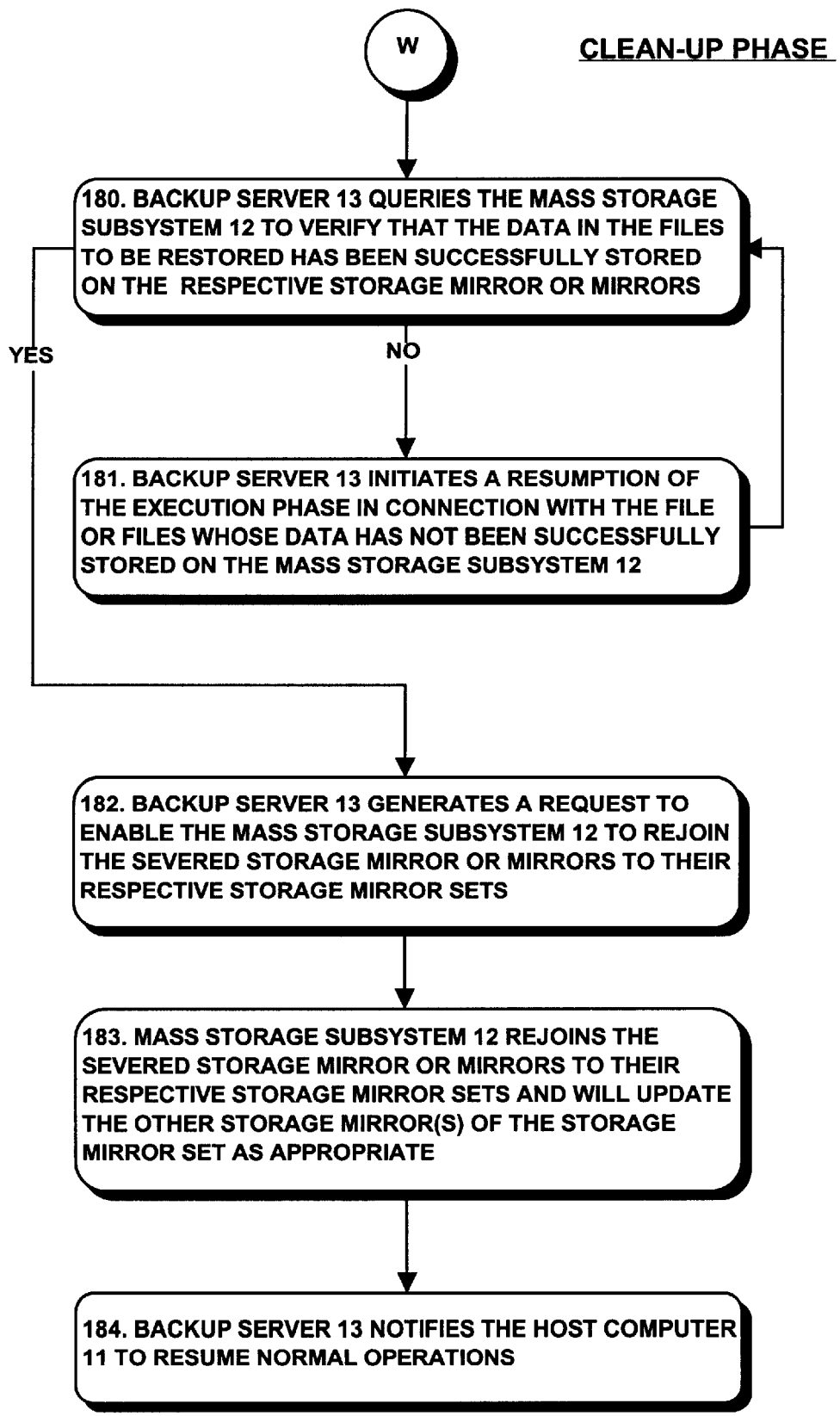

The detailed operations performed in connection with backup and restore operations will be described in connection with the flowcharts in FIGS. 2 and 3, respectively. With reference to FIG. 2, the backup server 13 initially receives from the host computer 11 one or more identifiers identifying data to be backed up. The identifiers may be provided to the host computer 11 by an operator who is controlling operations by the host computer 11. The operator may provide the identifiers for the data to be backed up each time the backup operation is to be performed, or alternatively he or she may provide the identifiers and the host computer can provide those identifiers to the backup server 13 periodically, thereby to enable the backup server 13 to perform periodic backups of the data identified by the operator. In one embodiment, in which the application being executed by the host computer is a database management system making use of a relational database, in which data is arranged in one or more tables, with each table being stored in one or more files, the backup server 13 will receive the identifications of tables whose data is to be backed up (step 100). The backup server 13, after receiving the table identifications, will query the host computer 11, in particular the database management system, to obtain the file name(s) of the particular file(s) which contain the data from the table(s) to be backed up (step 101). The computer 11 will respond with the filenames of the files which contain the tables whose data is to be backed up (step 102).

After the backup server 13 in step 102 obtains the filename(s) for the files containing the tables whose data is to be backed up, it (that is, the backup server) will perform a number of steps to determine the particular locations on the physical disk storage devices on which the data to be backed up is stored. Generally, each storage mirror 16($s$) will include one or more "logical volumes" (not separately shown) each of which may comprise one or physical disk storage devices (also not separately shown). Preferably, the physical disk storage devices associated with the respective storage mirrors 16($s$) will be disjoint, that is, the physical disk storage device on which data is stored for one storage mirror 16($s$) will not also be used for storing data for another storage mirror 16($s'$) ($s' \neq s$), so as to ensure that if one physical disk storage device in one storage mirror 16($s$) malfunctions, more than one storage mirror will not be affected. Each physical disk storage device, in turn, stored data in a plurality of blocks each of which can generally accommodate a predetermined maximum amount of data. A file is stored in a logical volume, and may include several portions which are distributed among one or more disks and one or more series of blocks, which are referred to herein as disk "extents" on each disk. Each block in turn, is identified by a block identifier. A file consists of data stored in an ordered series of disk extents, with each disk extent being identified by
  (i) a particular physical disk storage device, the physical disk storage device comprising one of the devices in the logical volume in which the file is stored;
  (ii) a starting block identifier which identifies the first block in the disk extent within the physical disk storage device; and
  (iii) a value identifying the number of successive blocks in the disk extent that forms part of the file.

In addition, it should be noted that, in one embodiment, logical volumes comprise the unit of storage which is mirrored among the respective storage mirrors. In addition, in one embodiment, each of the respective elements noted above is managed by a respective management element or component (also not separately shown). In particular, a file system element manages the associations between files and logical volumes, in particular identifying the particular logical volume on which each file is stored. A logical volume manager aggregates physical disk storage devices or portions thereof into logical volumes and also the series of one or more extents on the physical disk storage devices which contain data for the respective files. The logical volume manager performs these operations in connection with a single storage mirror 16($s$) which is available to it at any particular point in time, and a mirror management layer, in turn, identifies the particular storage mirrors 16($s$) in the storage mirror set for each logical volume and makes one of the storage mirrors available to the logical volume manager. Thus, logical volume as identified by the logical volume manager as containing a particular file will be the logical volume that is made available to it (that is, the logical volume manager) by the mirror management layer.

Thus, following step 102, to determine the particular locations on the physical disk storage devices on which the data to be backed up is stored, the backup server 13 will first generate a query for transmission to the file system element to enable the file system element to provide, for files containing data to be backed up, the identification of the particular logical volume on which the file is stored (step 103). The file system element generates a response containing the identification of the logical volume on which the files are stored (step 104). Thereafter, the backup server 13 generates a query for transmission to the logical volume manager to enable the logical volume manager to identify, for the respective files, the series of disk extents, including for each disk extent an identification of the respective physical disk storage device, in which the data for the respective files are stored (step 105). The logical volume manager will generate a response identifying, for each file, the series of disk extents and associated physical disk storage devices which contain the data for the respective file (step 106). Generally, if a series of disk extents for a file are contained in the same physical disk storage device, it will be appreciated that the logical volume manager need not provide the identification of the physical disk storage device along with each disk extent in the series, but instead can just identify the physical disk storage device along with the series. Thus, if, for example, a file is stored in a series of disk extents on one physical disk storage device followed by a series of disk extents on another physical disk storage device, it will be appreciated that the response provided by the logical volume manager in step 106 can provide the identification of the first physical disk storage device and the series of disk extents thereon on which the file is stored, followed by the identification of the second physical disk storage device and the series of disk extents thereon on which the file is stored. If the file further contains a portion, following the portion contained on the second physical disk storage device, stored either on yet a third physical disk storage device comprising the logical volume or on the first physical disk storage device, the response will include the identification of the physical disk storage device and the extent or series of extents thereon on which the file is stored.

After obtaining in step 106 the identification, for the files containing data to be backed up, of the disk extents and the physical disk storage devices on which the respective files are stored, the backup server generates a query to the mirror management element requesting identification of the various storage mirrors 16(s) which contain the logical volumes and to verify that the mass storage subsystem 12 has access to all of the physical disk storage devices comprising the respective storage mirrors 16(s) (step 107). The mirror management element, following receipt of the query generated in step 107, will provide a response comprising the identification of the respective storage mirrors 16(s) and a verification that the mass storage subsystem 12 can access all of the physical disk storage devices which comprise them (step 108). After the backup server 13 receives the response generated by the mirror management element in step 108, the discovery phase will have been completed.

As noted above, following the discovery phase of the backup operation, the system 10 performs the preparation phase. In the preparation phase, the backup server 13 will initially determine whether the backup is to proceed in an on-line manner or an off-line manner (step 110). Information as to whether the backup is to proceed in an on-line manner or an off-line manner may be provided by the host computer 11 either along with the filenames for the files to be backed up in step 100, or alternatively at some time during the discovery phase or at the beginning of the preparation phase. In one embodiment, the database management system comprising the application executed by host computer 11 can exist in two backup modes, in particular an off-line backup mode and an on-line backup mode. While the database management system is in the off-line backup mode, it is essentially disabled from operating. On the other hand, while the database management system is in the on-line backup mode, it can continue operating, and can continue retrieving data from the mass storage subsystem 12 and generating update data. If the database management system generated update data while it is in the on-line backup mode, it will store the update data in auxiliary files, which, after the end of the backup operation, will be used to update the data in the files being backed up. If the backup server 13 determines in step 110 that the backup operation is to proceed in an off-line manner, it will provide a notification to the host computer 11 to enable the database management system executed thereby to go into the off-line backup mode (step 111). On the other hand, if the backup server 13 determines in step 110 that the backup operation is to proceed in an on-line manner, it will provide a notification to the host computer 11 to enable the database management system executed thereby to go into the on-line backup mode (step 112).

After determining that the database management system has entered the appropriate off-line or on-line backup modes (steps 113 and 114, respectively), the backup server 13 generates a request to the mass storage subsystem 12 to enable it (that is, the mass storage subsystem) to, for each storage mirror set containing a logical volume which, in turn, contains a file to be backed up, sever one of the storage mirrors $16(s_s)$ and make it available to the backup server 13 as the source of data for the backup (step 115).

After the mass storage subsystem 12 has severed the required storage mirrors and made them available to the backup server 13 (step 116), the backup server 13 will generate a notification for transfer to the host computer 11 which effectively indicates that the backup operation, from the standpoint of the database management system executed by the host computer 11, has been completed (step 117). Thus, if the database management system was, in step 111, placed in the off-line backup mode, the host computer 11 will enable it to resume normal operations. Similarly, if the database management system was in step 112, placed in the on-line backup mode, the host computer 11 will also enable it to resume normal operations, and in addition will enable it to update files on the mass storage subsystem 12 with data that was updated while it was operating in the on-line backup mode. It will be appreciated that the update data will initially be stored only in the storage mirrors of the respective storage mirror sets which were not severed in step 116 to be made available to the backup server. Following step 117, the preparation phase will have been completed.

As further noted above, following the preparation phase, the system 10 performs the execution phase, during which the backup server retrieves the data to be backed up from the mass storage subsystem 12 and provides it to the backup data store 14 for storage on the backup medium, which, as described above, in one embodiment comprises one or more tape cartridges. During the execution phase, the backup server 13 will provide the mass storage subsystem 12, in particular, the control circuitry 15, with, for each file to be backed up, a retrieval request including the list of disk extents and associated physical disk storage devices that was generated for the file during the discovery phase (step 120). Thereafter, the control circuitry 15 will retrieve the data from the storage mirrors 16($s_s$) of the respective storage mirror set or sets that had been severed and made available to the backup server 13 in step 116 for transfer to the backup server 13 (step 121). The backup server 13, in turn, will transfer the data provided thereto by the mass storage subsystem 12 to the backup data store 14 (step 122), which will store the data on the backup medium (step 123). It will be appreciated that the steps 120–123 performed during the execution phase may be performed in an overlapped manner, that is, as the control circuitry 15 retrieves data from the severed storage mirror(s) 16($s_s$), it will transfer the data to the backup server 13, which, in turn, will transfer it (that is, the data) to the backup data store 14 for storage on the backup medium. That is, the control circuitry 15 need not complete the retrieval of the data to be backed up in step 121 before beginning the transferring of it (that is, the retrieved data) to the backup server, and the backup server 13 need not receive all of the data to be backed up from the mass storage subsystem 12 before beginning the transferring of it to the backup media store 14 for storage. After all of the data to be backed up has been received from the mass storage subsystem 12, transferred to the backup data store 14 and stored on the backup medium, the execution phase will have been completed.

As further noted above, following the execution phase, the system will perform the clean-up phase, during which the backup server 13 verifies that all of the data from all of the files that were to be backed has been retrieved and stored on the backup medium by the backup data store 14, and further enables the mass storage subsystem 12 to rejoin the severed storage mirror or mirrors 16($s_s$) to their respective storage mirror sets. Thus, the backup server 13 can initially query the backup data store 14 to verify that the data in the files to be backed up has been successfully stored on the backup medium (step 130). If the backup server 13 makes a negative determination in step 130, that is, if it determines that data in one or more files has not been successfully stored on the backup medium, it will initiate a resumption of the execution phase in connection with the file or files whose data has not been successfully stored on the backup medium (step 131) and return to step 130.

If the backup server 13 makes a positive determination in step 130, either initially or following one or more resumed execution phases in step 131, it will generate a request to enable the mass storage subsystem 12 to rejoin the severed storage mirror or mirrors 16($s_s$) to their respective storage mirror sets (step 132). In response to the request generated in step 132, the mass storage subsystem 12 will rejoin the severed storage mirror or mirrors 16($s_s$) to their respective storage mirror sets and will update them as appropriate (step 133). In addition, the backup server 13 will generate or update a backup catalog for the backup, identifying each of the files that have been backed up and the particular backup medium on which the respective files have been stored. At this point, the backup operation will be complete, and the backup server 13 can so notify the host computer 11 (step 134).

The detailed operations performed in connection with the restore operation will be described in connection with the flowchart in FIG. 3. With reference to FIG. 3, the backup server 13 initially receives from the host computer 11 one or more identifiers identifying data to be restored. The identifiers may be provided to the host computer 11 by an operator who is controlling operations by the host computer 11. In one embodiment, in which the application being executed by the host computer is a database management system making use of a relational database, in which data is arranged in one or more tables, with each table being stored in one or more files, the backup server 13 will receive the identifications of tables whose data is to be restored (step 150). The backup server 13, after receiving the table identifications, will query the host computer 11, in particular the database management system, to obtain the file name(s) of the particular file(s) which contain the data from the table(s) to be restored (step 151). The computer 11 will respond with the filenames of the files which contain the tables whose data is to be restored (step 152).

After the backup server 13 in step 152 obtains the filename(s) for the files containing the tables whose data is to be restored, it (that is, the backup server) will perform steps 153 through 156, corresponding to steps 103 through 106 described above, identify the particular physical disk storage device(s) and extent(s) on which the data to be restored should be stored. After obtaining the physical disk storage device and disk extent list onto which the files to be restored are to be stored, the backup server generates a query to the mirror management element requesting identification of the various storage mirrors 16($s$) which contain the logical volumes and to verify that the mass storage subsystem 12 has access to all of the physical disk storage devices comprising the respective storage mirrors 16($s$) (step 157). The mirror management element, following receipt of the query generated in step 157, will provide a response comprising the identification of the respective storage mirrors 16($s$) and a verification that the mass storage subsystem 12 can access all of the physical disk storage devices which comprise them (step 158). After the backup server 13 receives the response generated by the mirror management element in step 158, the discovery phase will have been completed.

As noted above, following the discovery phase of the restore operation, the system 10 performs the preparation phase. In the preparation phase of a restore operation, since the restore operation is typically performed because of the corruption or loss of data in or other malfunction of the mass storage subsystem 12, the database management system being executed by the host computer will normally be off-line or otherwise not operating. However, to ensure that the database management system is, in fact, off-line or otherwise not operating, the backup server 13 will initially generate a request to the host computer 11 to disable the database management system from operating (step 160). After the host computer 11 verifies that the database management system has been disabled (step 161), the backup server 13 generates a request to the mass storage subsystem 12 to enable it (that is, the mass storage subsystem) to, for each storage mirror set containing a logical volume which, in turn, contains the file to be restored, sever one of the storage mirrors 16($s_s$) and make it available to the backup server 13 as the destination source of data for the restoration operation (step 162). After the mass storage subsystem 12 has severed the required storage mirrors and made them available to the backup server 13 (step 163), the preparation phase will have been completed.

As further noted above, following the preparation phase, the system 10 performs the execution phase, during which the backup server 13 enables the data to be retrieved from the backup data store 14 and provides that data to the mass storage subsystem 12 for storage. During the execution phase, the backup server 13 will use the catalog generated during a backup operation to identify the backup media on which the files to be restored are backed up (step 170), and will enable the backup data store 14 to retrieve the data to be restored from the backup medium and transfer the data to it (that is, to the backup server 13) (step 171). In addition, for the respective files to be restored, the backup server 13 will provide to the mass storage subsystem 12, in particular to the control circuitry 15, a storage request including the list of disk extents and associated physical disk storage devices that was generated for the file during the discovery phase along with the data to be stored thereon (step 172). As the control circuitry 15 receives the information, that is, the list of disk extents, associated physical disk storage devices and data, from the backup server 13, it will store the data onto the physical disk storage devices and disk extents of the storage mirrors $16(s_s)$ of the respective storage mirror set or sets that had been severed and made available to the backup server 13 (step 173). It will be appreciated that the steps 170–173 performed during the execution phase may be performed in an overlapped manner, similar to that described above in connection with a backup operation. After all of the data to be restored has been received from the backup data store 14, transferred to the backup mass storage subsystem 12 and stored on the respective storage mirrors $16(s_s)$, the execution phase will have been completed.

As further noted above, following the execution phase, the system will perform the clean-up phase, during which the backup server 13 verifies that all of the data from all of the files that were to be restored has been retrieved and stored on the mass storage subsystem 12, and further enables the mass storage subsystem 12 to rejoin the severed storage mirror or mirrors $16(s_s)$ to their respective storage mirror sets. Thus, the backup server 13 can initially query the mass storage subsystem 12 to verify that the data in the files to be restored has been successfully stored on the respective storage mirror or mirrors $16(s_s)$ (step 180). If the backup server 13 makes a negative determinations in step 180, that is, if it determines that data in one or more files has not been successfully stored on the mass storage subsystem 12, it will initiate a resumption of the execution phase in connection with the file or files whose data has not been successfully stored on the mass storage subsystem 12 (step 181) and return to step 180.

If the backup server 13 makes a positive determination in step 180, either initially or following one or more resumed execution phases in step 181, it will generate a request to enable the mass storage subsystem 12 to rejoin the severed storage mirror or mirrors $16(s_s)$ to their respective storage mirror sets (step 182). In response to the request generated in step 182, the mass storage subsystem 12 will rejoin the severed storage mirror or mirrors $16(s_s)$ to their respective storage mirror sets and will update the other storage mirror (s) of the storage mirror set as appropriate (step 183). At this point, the restore operation will be complete, and the backup server 13 can so notify the host computer 11, which can re-activate the database management system (step 134).

The invention provides a number of advantages. In particular, it provides an arrangement for performing backup in connection with a mirror copy of data stored on a mass storage subsystem 12, which will permit the application or application, such as the database management system as described herein, being executed on the host computer 11 to continue operations after only a brief time period, while the respective storage mirror is being severed during the execution phase. This will allow for greater availability of the respective application, during the backup operation. In addition, since backup is being managed by a backup server separate and apart from the host computer 11, the host computer is relieved of that burden, which can enhance throughput by the host computer.

It will be appreciated that a number of variations and modifications may be made to the system 10 as described above. For example, although the system 10 is described as having a single host computer 11 and backup server 13, it will be appreciated that a system 10 in accordance with the invention can have a number such host computers and/or backup servers 13. In addition, although the host computer has been described as executing a database management system as an application, it will be appreciated that a number of types of applications may be executed by the host computer or computers.

Furthermore, it will be appreciated that during the discovery phase of a backup operation, if a plurality of files is to be backed up, the various operations performed in connection with the file system element, the logical volume manager and the mirror management element may be performed seriatim (that is, one after another) for respective files whose data is to be backed up, or alternatively, the operations may be performed contemporaneously for a plurality of files, for example in a pipelined manner.

In addition, although the mass storage subsystem 12 in one embodiment has been described as comprising a mass storage subsystem as described in the above-mentioned Yanai and Vishlitzky patents, it will be appreciated that mass storage subsystem having a variety of architectures may be used in system 10. Further, although the backup server 13 has been described as including a suitably programmed personal computer or workstation, it will be appreciated that any type of programmable computer or special purpose hardware can be used. In addition, it will be appreciated that any type of connection, including direct cable connection or network, can be used to interconnect the host computer 11, mass storage subsystem 12, backup server 13 and backup data store 14.

In addition, in one embodiment, the backup server 13 makes use of operating system-independent file handling calls and methodologies described in as described the aforementioned U.S. patent application Ser. No. 09/052,356, entitled "System And Method For Performing File-Handling Operations In A Digital Data Processing System Using An Operating System-Independent file Map", and an operating system-independent file map generated as described in the aforementioned U.S. patent application Ser. No. 09/052,209, entitled "System And Method For Generating An Operating System-Independent File Map", in retrieving data from the mass storage subsystem 12 to be backed up during a backup operation, and in providing data to the mass storage subsystem 12 for storage during a restore operation.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A backup server for controlling the backing up of data stored on a mass storage subsystem in response to a backup request from a host identifying data to be backed up during a backup operation, the mass storage subsystem storing data in a plurality of mirrored copies, the backup server comprising:
   A. a discovery module configured to receive the backup request and identify during a discovery phase at least one storage location on the mass storage subsystem on which data to be backed up during the backup operation is stored;
   B. a preparation module configured to, during a preparation phase after the discovery phase, disable the host from operating in connection with data stored on the mass storage subsystem, enable the mass storage subsystem to sever one of said mirrored copies for use during the backup operation and thereafter re-enable the host to operate in connection with data from at least one other of the mirrored copies;
   C. an execution module configured to, during the execution phase, enable the mass storage subsystem to retrieve data from the at least one storage location on the severed mirrored copy and transfer the retrieved data to the backup server to facilitate backup storage; and
   D. a clean-up module configured to, during a clean-up phase following the execution phase, verify that the data to be backed up has been stored in backup storage and, if so, enable the mass storage subsystem to re-synchronize the mirrored copies.

2. A backup server as defined in claim 1 in which
   A. the backup server provides a disable notification during the preparation phase to disable the host to operate in connection with data from at least one other of the mirrored copies, and
   B. the host, in response to the disable notification from the backup server, enters a backup mode, in which it stops operations in connection with data stored on the mass storage subsystem.

3. A backup server as defined in claim 2 in which
   A. the backup server provides an enable notification during the preparation phase to re-enable the host to operate in connection with data from at least one other of the mirrored copies, and
   B. the host, in response to the enable notification from the backup server, resumes operations in connection with data stored on the mass storage subsystem.

4. A backup server as defined in claim 1 further including a backup data store interface configured to transfer data provided by the mass storage subsystem to a backup data store for storage.

5. A backup server as defined in claim 1 in which the backup request includes a file identification identifying at least one file and in which the host includes a file system, the discovery module querying the file system to receive the identification of the at last one storage location.

6. A backup server as defined in claim 5 in which the mass storage subsystem includes at least one logical volume on which data is stored, the file system providing an identification of the logical volume the identification of the at least one storage location.

7. A backup server as defined in claim 6 in which the mass storage subsystem includes at least one physical storage device, the logical volume including at least a portion of the physical storage device, and the data comprising the file being stored on at least one portion of the at least one physical storage device, the host further including a logical volume manager, the discovery module querying the logical volume manager to obtain an identification of the at least one portion of the at least one physical storage device on which data comprising the file is stored.

8. A backup server as defined in claim 7 in which the physical storage device stores data on a series of blocks, identification of the at least one portion of the at least one physical storage device including a base block identifier identifying at least one of said blocks and a length value identifying a number of contiguous blocks comprising said at least one portion of he at least one physical storage device.

9. A backup server as defined in claim 1 in which the backup server further maintains a catalog for backed-up data, the clean-up module further begin configured to update the catalog during the clean-up phase to identify a location of the data backed up during the backup operation on a backup storage medium.

10. A backup server for controlling the restoration of data on a mass storage subsystem in response to a restore request from a host identifying data to be restored during a restore operation, the mass storage subsystem storing data in a plurality of mirrored copies, the backup server comprising:
    A. a discovery module configured to receive the restore request and identify during a discovery phase at least one storage location on the mass storage subsystem on which data to be restored during the backup operation;
    B. a preparation module configured to, during a preparation phase after the discovery phase, enable the mass storage subsystem to sever one of said mirrored copies for use during the backup operation;
    C. an execution module configured to, during the execution phase, enable the mass storage subsystem to receive data from backup storage and store it on the at least one storage location on the severed mirrored copy to facilitate restoration; and
    D. a clean-up module configured to, during a clean-up phase following the execution phase, verify that the data to be restored has been stored on the at least one storage location and, if so, enable the mass storage subsystem to re-synchronize the mirrored copies.

11. A backup server as defined in claim 10 in which the which the backup server provides a disable notification during the preparation phase to disable the host to operate in connection with data from at least one other of the mirrored copies.

12. A backup server as defined in claim 11 in which the backup server provides an enable notification during the preparation phase to re-enable the host to operate in connection with data from at least one other of the mirrored copies.

13. A backup server as defined in claim 10 further including a backup data store interface configured to receive from a backup data store for transfer to the mass storage subsystem.

14. A backup server as defined in claim 10 in which the restore request includes a file identification identifying at least one file and in which the host includes a file system, the discovery module querying the file system to receive the identification of the at last one storage location.

15. A backup server as defined in claim 14 in which the mass storage subsystem includes at least one logical volume on which data is stored, the file system providing an identification of the logical volume as the identification of the at least one storage location.

16. A backup server as defined in claim 15 in which the mass storage subsystem includes at least one physical storage device, the logical volume including at least a portion of the physical storage device, and the data comprising the file being stored on at least one portion of the at least one physical storage device, the host further including a logical volume manager, the discovery module querying the logical volume manager to obtain an identification of the at least one portion of the at least one physical storage device on which data comprising the file is stored.

17. A backup server as defined in claim 16 in which the physical storage device stores data on a series of blocks, identification of the at least one portion of the at least one physical storage device including a base block identifier identifying at least one of said blocks and a length value identifying a number of contiguous blocks comprising said at least one portion of he at least one physical storage device.

18. A backup server as defined in claim 10 in which the backup server further maintains a catalog for backed-up data, the clean-up module further begin configured to update the catalog during the clean-up phase to identify a location of the data backed up during the backup operation on a backup storage medium.

19. A method of operating a backup arrangement including a backup server for controlling the backing up of data stored on a mass storage subsystem in response to a backup request from a host identifying data to be backed up during a backup operation, the mass storage subsystem storing data in a plurality of mirrored copies, the method comprising the steps of:
   A. enabling the backup server to receive the backup request and identify during a discovery phase at least one storage location on the mass storage subsystem on which data to be backed up during the backup operation is stored;
   B. enabling the backup server to, during a preparation phase after the discovery phase, disable the host from operating in connection with data stored on the mass storage subsystem, enable the mass storage subsystem to sever one of said mirrored copies for use during the backup operation and thereafter re-enable the host to operate in connection with data from at least one other of the mirrored copies;
   C. enabling the backup server to, during the execution phase, enable the mass storage subsystem to retrieve data from the at least one storage location on the severed mirrored copy and transfer the retrieved data to the backup server to facilitate backup storage; and
   D. enabling the backup server to, during a clean-up phase following the execution phase, verify that the data to be backed up has been stored in backup storage and, if so, enable the mass storage subsystem to re-synchronize the mirrored copies.

20. A method of operating a backup arrangement including a backup server for controlling the restoration of data on a mass storage subsystem in response to a restore request from a host identifying data to be restored during a restore operation, the method comprising the steps of:
   A. enabling the backup server to receive the restore request and identify during a discovery phase at least one storage location on the mass storage subsystem on which data to be restored during the backup operation;
   B. enabling the backup server to, during a preparation phase after the discovery phase, enable the mass storage subsystem to sever one of said mirrored copies for use during the backup operation;
   C. enabling the backup server to, during the execution phase, enable the mass storage subsystem to receive data from backup storage and store it on the at least one storage location on the severed mirrored copy to facilitate restoration; and
   D. enabling the backup server to, during a clean-up phase following the execution phase, verify that the data to be restored has been stored on the at least one storage location and, if so, enable the mass storage subsystem to re-synchronize the mirrored copies.

21. A computer program product for use in connection with a computer to form a backup server for controlling the backing up of data stored on a mass storage subsystem in response to a backup request from a host identifying data to be backed up during a backup operation, the computer program product including a computer-readable medium having encoded thereon:
   A. a discovery module configured to enable the computer to receive the backup request and identify during a discovery phase at least one storage location on the mass storage subsystem on which data to be backed up during the backup operation is stored;
   B. a preparation module configured to enable the computer to, during a preparation phase after the discovery phase, disable the host from operating in connection with data stored on the mass storage subsystem, enable the mass storage subsystem to sever one of said mirrored copies for use during the backup operation and thereafter re-enable the host to operate in connection with data from at least one other of the mirrored copies;
   C. an execution module configured to enable the computer to, during the execution phase, enable the mass storage subsystem to retrieve data from the at least one storage location on the severed mirrored copy and transfer the retrieved data to the backup server to facilitate backup storage; and
   D. a clean-up module configured to enable the computer to, during a clean-up phase following the execution phase, verify that the data to be backed up has been stored in backup storage and, if so, enable the mass storage subsystem to re-synchronize the mirrored copies.

22. A computer program product for use in connection with a computer to form a backup server for controlling the restoration of data on a mass storage subsystem in response to a restore request from a host identifying data to be restored during a restore operation, the computer program product including a computer-readable medium having encoded thereon:
   A. a discovery module configured to enable the computer to receive the restore request and identify during a discovery phase at least one storage location on the mass storage subsystem on which data to be restored during the backup operation;
   B. a preparation module configured to enable the computer to, during a preparation phase after the discovery phase, enable the mass storage subsystem to sever one of said mirrored copies for use during the backup operation;
   C. an execution module configured to enable the computer to, during the execution phase, enable the mass storage subsystem to receive data from backup storage and store it on the at least one storage location on the severed mirrored copy to facilitate restoration; and
   D. a clean-up module configured to enable the computer to, during a clean-up phase following the execution phase, verify that the data to be restored has been stored on the at least one storage location and, if so, enable the mass storage subsystem to re-synchronize the mirrored copies.

* * * * *